June 20, 1950  I. T. HART  2,512,232
REVERSIBLE RATCHET SCREW DRIVER
Filed Jan. 17, 1947
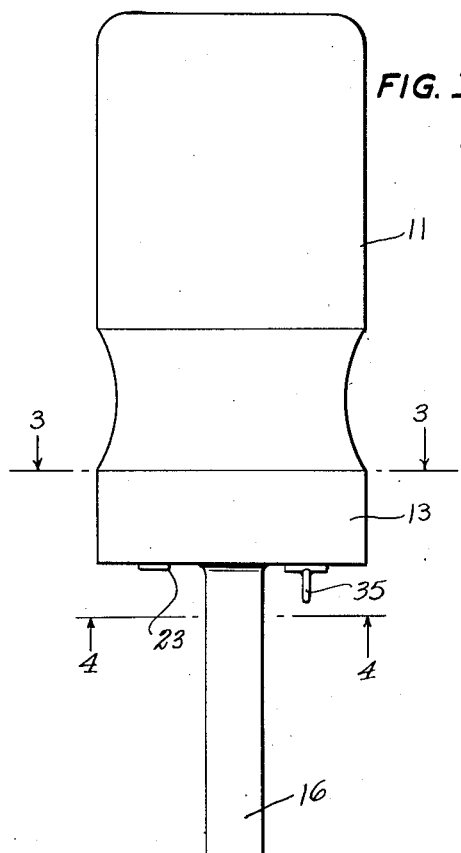
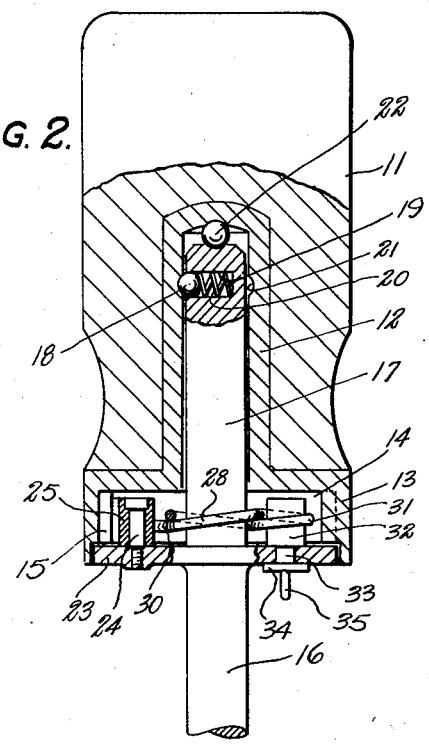
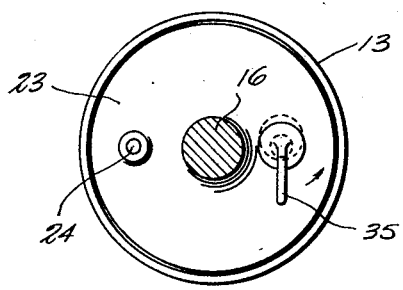
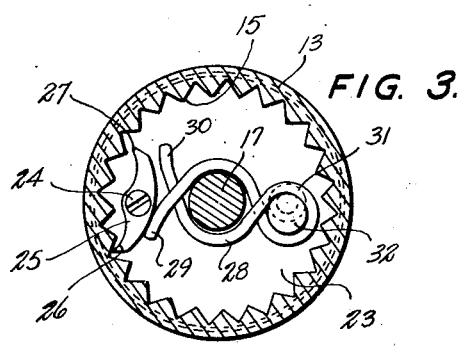
Inventor
IVAN T. HART,
By McMorrow, Berman & Davidson
Attorneys Patented June 20, 1950

2,512,232

UNITED STATES PATENT OFFICE 2,512,232

REVERSIBLE RATCHET SCREW DRIVER

Ivan T. Hart, Reno, Nev.

Application January 17, 1947, Serial No. 722,723

3 Claims. (Cl. 145—75)

This invention relates to screw drivers, and more particularly to a screw driver of the ratchet type, namely, of the type wherein rotation of the shank may be effected in only one direction for a given setting of the tool or in only the other direction for a different setting of the tool.

A main object of the invention is to provide a novel and improved ratchet screw driver which is very simple in construction, easy to adjust and reliable in operation.

A further object of the invention is to provide an improved ratchet screw driver which is inexpensive to manufacture, sturdy in construction and convenient to use.

Further objects and advantages of the invention will become apparent from the following description and claims and from the accompanying drawings, wherein:

Figure 1 is an elevational view of a screw driver construction in accordance with the present invention.

Figure 2 is a detail view, partly in cross-section, of the handle portion of the screw driver of Figure 1.

Figure 3 is a cross-sectional view taken on line 3—3 of Figure 1.

Figure 4 is a cross-sectional detail view taken on line 4—4 of Figure 1.

Referring to the drawings, 11 designates the handle of the screw driver, said handle being made of any suitable material and preferable of plastic material molded around an inner hollow metal core 12. Core 12 is formed with an annular skirt portion 13 at its base which defines a generally cylindrical cavity 14. The inner wall surface of skirt portion 13 is serrated to define vertical teeth 15 extending around said inner wall surface.

The shank of the screw driver is designated at 16, said shank having a tang 17 which is received within core 12 and is rotatively secured therein by a spring-pressed ball 18 positioned in a recess 19 formed in the upper portion of tang 17 and biased outwardly by a coil spring 20 seated in recess 19 behind ball 18. Ball 18 engages an annular groove 21 formed in the inner wall surface of core 12. A ball bearing 22 is provided at the top end of tang 17, said ball bearing being seated in opposed rounded depressions formed in the top end of the tang and the top wall surface of core 12.

Shank 16 is formed with a circular flange 23 which is rotatively received in the bottom portion of skirt 13. Pivotally secured to flange 23 by a pivot pin 24 is a rockable dog 25 formed with teeth 26 and 27 adapted to selectively engage the recesses between adjacent ratchet teeth 15 in the inner wall surface of skirt 13. Encircling tang 17 is the intermediate portion of a looped resilient wire member 28, said wire member having free end arms 29 and 30 adapted to selectively bear with spring pressure on dog 25 on opposite sides of pivot pin 24. At its opposite end, wire member 28 is formed with a loop 31 encircling a stud member 32 which is eccentrically pivoted to flange 23 by a shank portion 33. Below shank portion 33 the stud is formed with a bearing flange 34 engaging the bottom surface of flange 23, said bearing flange 34 carrying a lever arm 35. By rotating lever arm 35, wire member 28 is rocked from a position wherein arm 29 abuts dog 25 adjacent tooth 26, as shown in Figure 3, to a position wherein arm 30 abuts dog 25 adjacent tooth 27 and causes the dog 25 to be rocked so that tooth 27 is interlocked with the serrated inner wall surface of skirt 13 and tooth 26 is freed therefrom. In the first position of lever arm 35 torque can be transmitted from handle 11 to shank 16 in only one direction, whereas in the second position of said lever arm torque can be transmitted by the handle to the shank in only the opposite direction. Lever arm 35 is therefore employed to set the ratchet mechanism for transmitting torque to shank 16 from handle 11 in whichever direction is desired.

The releasable locking engagement of ball 18 with groove 21 permits the tang 17 to be withdrawn from core 12 whenever it is necessary to clean or repair the ratchet mechanism.

While a specific embodiment of a ratchet screw driver has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. In a screwdriver including a hollow handle and a screwdriver shank having a tang portion rotatively received in said handle, ratchet means drivingly connecting said handle to said shank for rotation of said shank in either direction by said handle, said ratchet means comprising an annular skirt carried by said handle at one end of the latter and having longitudinal serrations formed around its inner surface, a circular flange carried by said shank and rotatively received within said skirt, a dog pivoted at its center to said flange and arranged so that its ends may selectively engage the serrations whereby torque may be transmitted in one direction or the other from the handle to the shank, a resilient wire member looped around the shank and having free end portions adapted to engage the dog at opposite sides of its center pivot to selectively rock it to locking positions with respect to said serrations, a loop formed in said wire member, and a stud engaged in said loop, said stud being eccentrically pivoted to said flange and being provided with an actuating lever below the flange.

2. In a screwdriver including a hollow handle and a shank having a tang rotatably received in said hollow handle, ratchet means drivingly connecting said handle to said shank for rotation of said shank by said handle in either direction, said ratchet means comprising an annular, co-axial skirt on one end of said handle, said skirt having on the inner surface thereof serrations extending in a direction parallel to the axis of said handle, a circular flange on said shank rotatably received in the open end of said annular skirt, a double-ended dog carried by said flange within said skirt, means pivotally connecting said dog at its mid-length location to said flange, a looped spring surrounding said tang with its ends in engagement with the opposite ends of said dog and a loop in the end thereof opposite said dog, and a stud eccentrically mounted in said flange and engaged in said spring loop, said stud having a handle on the side of said flange opposite said dog to rotate said stud and thereby bring the ends of said dog selectively into engagement with said serrations.

3. In a screwdriver including a hollow handle and a screwdriver shank having a tang portion rotatably received in said handle, ratchet means drivingly connecting said handle to said shank for rotation of said shank in either direction by said handle comprising an annular skirt carried by said handle and having longitudinal serrations formed around its inner surface, a circular flange carried by said shank and rotatably received within said skirt, a dog pivoted at its center to said flange and arranged so that its ends are alternatively engageable with the serrations in said skirt for selectively transmitting torque in one direction or the other from said handle to said shank, a resilient lever member pivoted to said shank and having arm portions alternatively engaging the dog at respectively opposite sides of the pivotal connection between said dog and said flange for selectively rocking said dog to bring one or the other end thereof into engagement with said serrations, and means on said flange for moving said resilient lever member to rock said dog.

IVAN T. HART.

REFERENCES CITED

The following references are of record in the file of this patent:

UNITED STATES PATENTS

| Number | Name | Date |
| --- | --- | --- |
| 176,811 | Richards | May 2, 1876 |
| 277,561 | Furbish | May 15, 1883 |
| 683,167 | Adams | Sept. 24, 1901 |
| 1,412,718 | Straehle | Apr. 11, 1922 |
| 1,635,102 | Watson | July 5, 1927 |
| 1,991,766 | Matveyeff | Feb. 19, 1935 |
| 2,103,556 | Rueb | Dec. 28, 1937 |